United States Patent [19]

Funaki et al.

[11] Patent Number: 5,292,587

[45] Date of Patent: Mar. 8, 1994

[54] MATERIAL FOR EXTRUSION MOLDING AND PROCESS FOR PREPARATION OF MOLDING PRODUCT

[75] Inventors: Keisuke Funaki, Ichihara; Komei Yamasaki, Sodegaura, both of Japan

[73] Assignee: Idemitsu Kosan Co., Ltd., Tokyo, Japan

[21] Appl. No.: 930,329

[22] Filed: Aug. 17, 1992

Related U.S. Application Data

[62] Division of Ser. No. 464,935, Jan. 16, 1990, Pat. No. 5,164,479.

[30] Foreign Application Priority Data

Jan. 24, 1989 [JP] Japan .................. 13238/1989

[51] Int. Cl.$^5$ .................. B29B 9/06; C08L 25/04
[52] U.S. Cl. .................. 428/402; 528/502; 528/503; 526/347.2; 524/577; 525/241; 264/177.1; 264/177.17; 264/177.2; 264/331.17; 264/345; 264/348
[58] Field of Search ............ 428/402; 528/502, 503; 264/177.1, 177.17, 331.17, 177.2, 345, 348; 524/577; 525/241; 526/347.2

[56] References Cited

U.S. PATENT DOCUMENTS

| | | |
|---|---|---|
| 3,010,935 | 11/1961 | Donald .................. 428/402 |
| 4,959,435 | 9/1990 | Seitz et al. .................. 526/347.2 |
| 5,006,296 | 4/1991 | Pedersen .................. 264/176.1 X |

FOREIGN PATENT DOCUMENTS

| | | |
|---|---|---|
| 0291915 | 11/1988 | European Pat. Off. |
| 0318794 | 11/1988 | European Pat. Off. |
| 0325125 | 1/1989 | European Pat. Off. |
| 0356856 | 3/1990 | European Pat. Off. .......... 526/348.1 |

OTHER PUBLICATIONS

Chemical Abstracts, vol. 108, 1988, p. 49, abstract No. 151651n for JP 62-257950.

Spencer et al, "The Viscous Flow of Molten Polystyrene . . . ", Journal of Colloid Sci., vol. 4, 241 (1949).

*Primary Examiner*—Fred Teskin
*Attorney, Agent, or Firm*—Oblon, Spivak, McClelland, Maier & Neustadt

[57] ABSTRACT

Disclosed are a material for extrusion molding comprising a styrene-based polymer having a high degree of syndiotactic configuration, a melt viscosity of $10^3$ to less than $10^6$ poise measured at 300° C. and a shearing rate of 10/sec, and a crystallinity of 15% or more, a process for preparation of the said material and a process for preparation of a molding product therefrom.

The molding product prepared according to the present invention has excellent properties such as heat resistance and chemical resistance.

14 Claims, No Drawings

MATERIAL FOR EXTRUSION MOLDING AND PROCESS FOR PREPARATION OF MOLDING PRODUCT

This is a division of application Ser. No. 07/464,935, filed on Jan. 16, 1990, U.S. Pat. No. 5,164,479.

BACKGROUND OF THE INVENTION

1. Field of the Invention

The present invention relates to a material for extrusion molding and a process for preparation of molding products therefrom. More particularly, it is concerned with a material for extrusion molding, a process for preparation thereof, and a process for preparing molded articles therefrom, such as fiber, nonwoven fabric, film, sheet, tube, rod, and bottle.

2. Description of the Related Arts

The general purpose styrene-based polymer which is produced by conventional radical polymerization etc., has an atactic configuration and is amorphous. However, the polystyrene having an atactic configuration, being used in various fields, has poor heat resistance and solvent resistance, therefore an improvement of these characteristics is required.

Since the styrene-based polymer having a high degree of syndiotactic configuration which the present inventors' group developed previously has a high melting point, a high crystallization rate, an excellent heat resistance and an excellent chemical resistance, it is expected to be used in various fields. Consequently, it was proposed that the styrene-based polymer having a high degree of syndiotactic configuration is used for stretched film, sheet, yarn, fiber, nonwoven fabric (Japanese Patent Application Laid-Open No. 182346/1989 etc.) The above products are expected to be obtained by continuous molding by melt extrusion. In the molding process, a styrene-based polymer having a high degree of syndiotactic configuration or a composition containing the styrene-based polymer are fed as pellet for the raw material. The suggestion of this pellet was not disclosed previously. Pellets that have been pelletized by a conventional method have the problems described below.

When these pellets are heated to a temperature above the glass transition temperature thereof, the pellets easily adhere to one another to form an agglomerate in the feed zone of the extruder, or adhere to the screw and the inner wall of barrel of the extruder. As a result, pellets are not fed smoothly, or when they are heated in the hopper before feeding into the extruder, the adhering pellets form an agglomerate at the exit of the hopper, and accordingly the continuous molding is sometimes hindered. When pellets are not fed smoothly, the retention time in melting is prolonged, an offensive odor is caused by the decomposition of the polymer. In addition, the appearance and physical properties of the products become poor due to foaming caused in molding, whereby the products are not suitable for practical use. Even when pellets are molded without such problems, products with a poor appearance caused by melt fracture are occasionally observed.

Therefore, the present inventors group have made intensive studies to solve the problems described above and provide a material for extrusion molding to be an excellent extrusion product with good appearance and physical properties in a stable continuous process, together with a process for preparation thereof and a process for preparing the molding products.

SUMMARY OF THE INVENTION

As the result, the present inventors found that the problems described above were solved by controlling the crystallinity of a styrene-based polymer having a high degree of syndiotactic configuration and a specific melting viscosity to a suitable range, or by melt extrusion at a shearing stress of not more than $5 \times 10^6$ dyne/cm$^2$.

Thus, the present invention was accomplished based upon the knowledge described above.

The present invention provides a material for extrusion molding comprising a styrene-based polymer having a high degree of syndiotactic configuration, a crystallinity of at least 15% and a melting viscosity of $10^3$ to $10^6$ (exclusive of $10^6$) poise measured at 300° C. and a shearing rate of 10/sec, and provides a process for preparing the material for extrusion molding which comprises melt extruding a styrene-based polymer or a composition containing said polymer having a high degree of syndiotactic configuration and a melting viscosity of $10^3$ to $10^6$ poise measured at 300° C. and a shearing rate of 10/sec, and air cooling, or water cooling and then heating the resulting extruded substance. Moreover, the present invention provides a process for preparing the molding products which comprises melt extruding a material comprising a styrene-based polymer having a high degree of syndiotactic configuration or a composition thereof under a shearing stress of $5 \times 10^6$ dyne/cm$^2$ or less. In addition, the present invention provides a process for preparing the molding products which comprises melt extruding, under a shearing stress of $5 \times 10^6$ dyne/cm$^2$ or less, a material comprising a styrene-based polymer having a high degree of syndiotactic configuration, a crystallinity of at least 15% and a melting viscosity of $10^3$ to $10^6$ (exclusive of $10^6$) poise measured at 300° C. and a shearing rate of 10/sec, or a composition containing said polymer.

DESCRIPTION OF THE PREFERRED EMBODIMENTS

The styrene-based polymers used as a material for molding or its main component in the present invention have a high degree of syndiotactic configuration. The styrene-based polymers having a high degree of syndiotactic configuration refer to styrene-based polymers having a high stereostructure that is syndiotactic, i.e., a stereostructure in which phenyl groups or substituted phenyl groups as side chains are located alternately at opposite positions relative to the main chain composed of carbon-carbon bonds. The tacticity is quantitatively determined by the nuclear magnetic resonance method using a carbon isotope ($^{13}$C-NMR method). The tacticity determined by the $^{13}$C-NMR method is indicated in terms of proportions of structural units continuously connected to each other, i.e., a diad in which three structural units are connected to each other, and a pentad in which five structural units are connected to each other.

The styrene-based polymers having a high degree of syndiotactic configuration of the present invention include polystyrene, poly(alkylstyrene), poly(halogenated styrene), poly(alkoxystyrene), polyvinyl benzoate or mixtures thereof, and copolymers containing them as main components, each having such a syndiotactic configuration that the proportion of a racemic diad is at least 75% and preferably at least 85%, or the proportion of a racemic pentad is at least 30% and preferably at least 50%.

The poly(alkylstyrene) includes polymethylstyrene, polyethylstyrene, polyisopropylstyrene, and poly(tert-butylstyrene). The poly(halogenated styrene) includes polychlorostyrene, polybromostyrene, and polyfluorostyrene. The poly(alkoxystyrene) includes polymethoxystyrene, and polyethoxystyrene. Particularly preferred among the above polymers are polystyrene, poly(p-methylstyrene), poly(m-methylstyrene), poly(p-tert-butylstyrene), poly(p-chlorostyrene), poly(m-chlorostyrene), poly(p-fluorostyrene), and a copolymer of styrene and p-methylstyrene, (Japanese Patent Application, Laid Open No. 187708/1987). Among these polymers, polymers having melting viscosity of $10^3$ to $10^6$ (exclusive of $10^6$) poise measured at 300° C. and at a shearing rate of 10/sec, are used in the present invention.

If the melting viscosity is less than $10^3$ poise, the polymer is difficult to be formed into a pellet as the molding material, but if it is not less than $10^6$ poise, the polymer is hard to be melt extruded.

The weight average molecular weight of the styrene-based polymer used in the present invention is preferably at least 10,000, and is most preferably at least 50,000. Moreover the molecular weight distribution is not critical, and styrene-based polymers in various ranges of molecular weight can be applied. The styrene-based polymer having a high degree of syndiotactic configuration has a melting point of 160° to 310° C., and superior heat resistance to the general purpose styrene-based polymer having an atactic configuration.

The styrene-based polymers having a high degree of syndiotactic configuration can be produced by polymerizing styrene-based monomers (corresponding to the above styrene-based polymers) using a catalyst comprising a titanium compound and a condensate of water and trialkyl aluminium in, for example, an inert hydrocarbon solvent or in the absence of a solvent.

The material for molding in the present invention consists essentially of the styrene-based polymer described above or consists of composition obtained by blending this styrene-based polymer with at least one compound selected from a thermoplastic resin, a rubber, an inorganic filler, an antioxidant, a nucleating agent, a plasticizer, a solubilizing agent, a colorant and an antistatic agent.

Various kinds of antioxidant can be used in the present invention, but particularly preferred are phosphorus antioxidants including monophosphites and diphosphites, and phenolic antioxidants. Typical examples of the monophosphites are tris(2,4-di-tert-butylphenyl)-phosphite, and tris(mono or di-nonylphenyl)phosphite.

Preferred diphosphites are phosphorus compounds represented by the formula:

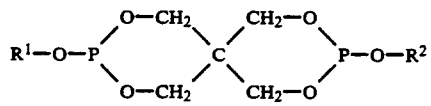

wherein $R^1$ and $R^2$ are each an alkyl group having 1 to 20 carbon atoms, a cycloalkyl group having 3 to 20 carbon atoms, or an aryl group having 6 to 20 carbon atoms.

Typical examples of the formula are distearylpentaerythritol diphosphite, dioctylpentaerythritol diphosphite, diphenylpentaerythritol diphosphite, bis(2,4-di-tert-butylphenyl)pentaerythritol diphosphite, bis(2,6-di-tert-butyl-4-methylphenyl)pentaerythritol diphosphite, and dicyclohexylpentaerythritol diphosphite.

Various known compounds can be used as the phenolic antioxidant. Representative examples are 2,6-di-tert-butyl-4-methylphenol, 2,6-diphenyl-4-methoxyphenol, 2,2'-methylenebis(6-tert-butyl-4-methylphenol), 2,2'-methylenebis(4-methyl-6-(alpha-methylcyclohexyl)-phenol), 1,1-bis(5-tert-butyl-4-hydroxy-2-methylphenyl)butane, 2,2'-methylenebis(4-methyl-6-cyclohexylphenol), 2,2'-methylenebis-(4-methyl-6-nonylphenol), 1,1,3-tris(5-tert-butyl-4-hydroxy-2-methylphenyl)butane, 2,2-bis(5-tert-butyl-4-hydroxy-2-methylphenyl)-4-n-dodecylmelcaptobutane, ethyleneglycol-bis(3,3-bis(3-tert-butyl-4-hydroxyphenyl)butylate), 1-1-bis(3,5-dimethyl-2-hydroxyphenyl)-3-(n-dodecylthio)butane, 4,4'-thiobis(6-tert-butyl-3-methylphenol), 1,3,5-tris(3,5-di-tert-butyl-4-hydroxybenzyl)-2,4,6-trimethylbenzene, 2,2-bis(3,5-di-tert-butyl-4-hydroxybenzyl)malonic acid dioctadecyl ester, n-octadecyl-3-(4-hydroxy-3,5-di-tert-butylphenyl)propionate, and tetrakis(methylene(3,5-di-tert-butyl-4-hydroxyhydrocinnamate))methane.

The above antioxidant is compounded in the amount of 0.0001 to 2 parts by weight, preferably 0.001 to 1 parts by weight per 100 parts by weight of the styrene-based resin having a high degree of syndiotactic configuration mentioned above.

If the amount of the antioxidant is less than 0.0001 parts by weight, a sufficient effect cannot be obtained because the molecular weight of the polymer drops steeply. If it is more than 2 parts by weight, on the other hand, the mechanical strength is adversely influenced.

The thermoplastic resins include styrene-based polymers such as a polystyrene having atactic configuration, a polystyrene having isotactic configuration, AS resin and ABS resin; polyester resin such as polyethylene terephthalate and polybutylene terephthalate; polycarbonate resin; polyether resin such as polyphenylene oxide; polysulfone and polyether sulfone; polyamide; polyphenylene sulfide (PPS); condensate polymer such as polyoxy methylene; acrylic polymer such as polyacrylic acid, polyacrylic acid ester and polymethyl methacrylate; polyolefin such as polyethylene, polypropylene, polybutene, poly-4-methyl pentene-1 and ethylene-propylene copolymer; or polyhalogenated vinyl polymers such as polyvinyl chloride, polyvinylidene chloride, and polyvinylidene fluoride.

Although various rubbers can be used, rubber-like copolymers containing a styrene-based compound as a component are most preferred. Examples are rubbers obtained by partially or fully hydrogenating the butadiene portion of a styrene-butadiene block copolymer (SEBS), styrene-butadiene copolymer rubber (SBR), methyl acrylate-butadiene-styrene copolymer rubber, acrylonitrile-butadiene-styrene copolymer rubber (ABS rubber), acrylonitrile-alkyl acrylate-butadiene-styrene copolymer rubber (AABS), methyl methacrylate-alkyl acrylate-styrene copolymer rubber (MAS), and methyl methacrylate-alkyl acrylate-butadiene-styrene copolymer rubber (MABS). These rubber-like copolymers which contain a styrene-based compound as a component have good dispersibility in styrene-based polymers having a syndiotactic configuration, because they have a styrene unit and, therefore, can markedly improve physical properties.

Other rubbers which can be used include natural rubber, polybutadiene, polyisoprene, polyisobutylene, neoprene, ethylene-propylene copolymer rubber, polysulfide rubber, thiokol rubber, acrylic rubber, urethane rubber, silicone rubber, epichlorohydrin rubber, polyether ester rubber, and polyester ester rubber.

The form of the inorganic filler is not critical and may be a fiber, a granule or a powder. Examples of fibrous inorganic fillers are glass fibers, carbon fibers, and alumina fibers. Examples of the granular or powder inorganic filler are talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide, and metal powder.

The material for molding in the present invention comprises the styrene-based polymer or a composition containing the polymer, and the styrene-based polymer should have a crystallinity of at least 15%, preferably at least 20%, and more preferably at least 30%.

In the composition containing the styrene-based polymer of the present invention, the ratio of the styrene-based polymer cannot be determined unconditionally, but is usually at least 10% by weight, preferably at least 30% by weight. Specifically, 3 to 200 parts by weight of thermoplastic resin, 10 to 150 parts by weight of an inorganic filler, 1 to 100 parts by weight rubber or a solubilizing agent, and less than 10 parts by weight of various additives per 100 parts by weight of the styrene-based polymer are preferred.

For production of these molding materials in the present invention, powder, pellet or granule of the styrene-based polymer or the composition thereof is melt extruded and pelletized. The temperature for melt extrusion varies with the styrene-based polymer or the composition thereof, and it is preferably selected in the range between the melting point and a temperature 100° C. higher than the melting point. For example, when using powder prepared by dry blending polystyrene as styrene-based polymer with 0.8% by weight of an antioxidant, the preferred temperature for melt extrusion is between 270° C. and 330° C. The extruder to be used includes uniaxial, biaxial, vent type, non-vent type extruders. Pelletizers of various types may be used, but any one of the under water cut type, the strand cut type and the hot cut type is preferred.

When pellets are cut in air after being extruded, cutting is preferably carried out under the condition of −20° C. to 240° C. and an air stream of less than 5 m/sec except that the pellets are made of composition containing resin retarding the rate of crystallization, such as an isotactic polystyrene, and an atactic polystyrene and polyphenylene ether.

When cutting is done after quenching with water, pellets with a relatively low crystallinity are obtained. By heating these pellets, pellets with a crystallinity required in the present invention can be obtained. A heating temperature is preferably selected in the range between the glass transition temperature and a temperature 10° C. lower than the melting point. For example, when the pellet, prepared by mixing a syndiotactic polystyrene with 0.8% by weight of an antioxidant, is used, the heating temperature is preferably 100° to 260° C., and more preferably 120° to 230° C. The crystallization period may be optionally selected depending on the styrene-based polymer or composition thereof to be used, since the styrene-based polymer and the composition containing no component to decompose the styrene-based polymer are not decomposed or colored over one day even at elevated temperature. The atmosphere for crystallization may be optionally selected from air, nitrogen, carbon dioxide and other inert gases. In this crystallization process, crystallization can be effectively achieved by stirring the system to unify the temperature and prevent agglomeration.

Thus, the crystallinity of the pellet should be adjusted to 15% or more measured by differential scanning calorimeter. Materials having such a crystallinity are preferably used for extrusion.

The shape of the material (pellet) for extrusion molding is not particularly limited and may be any shape of cylindrical, sphere and other similar shapes. Pellets having the ratio of lengths in the extrusion direction and the perpendicular direction (L/D) of 0.5 to 3, and the length or width of the extrusion direction or the perpendicular direction of 1 to 6 mm, are preferably used.

In order to prepare the molded product according to the present invention, extrusion molding is carried out by using the material (pellet) for extrusion molding prepared by the process as described above. In the present invention, extrusion molding includes injection molding in which the material is extruded continuously or semicontinuously. More specifically, it may include melt spinning, sheet molding, film molding, tube molding, rod molding or injection blow molding based on these. Molding is carried out under the shearing stress at the exit of the mold die of $5 \times 10^6$ dyne/cm$^2$ or less, preferably $5 \times 10^3$ to $3 \times 10^6$ dyne/cm$^2$. If the shearing stress exceeds $5 \times 10^6$ dyne/cm$^2$, appearance becomes poor such as uneven surface due to generation of melt fracture. The shearing stress can be optionally controlled by varying the molecular weight of the molding material, extrusion temperature, extrusion flow rate and the shape of extrusion die.

As described above, when the extrusion molding is carried out by using a pellet having the crystallinity of 15% or more under the shearing stress of $5 \times 10^6$ dyne/cm$^2$ or less, molding can be performed smoothly and continuously, and thus molding products having uniformity, good appearance and excellent physical properties can be obtained. Specific examples of molded products produced by the above process include fiber, nonwoven fabric, film, sheet, tube, rod and bottle.

Even in the styrene-based polymer and a composition thereof not having the specific crystallinity or the melt viscosity as described above, when melt extrusion molding is carried out under the shearing stress in the range of $5 \times 10^6$ dyne/cm$^2$ or less, molding products having a good appearance and physical properties to a certain extent can be obtained.

Extrusion molding in a continuous and stable condition can be carried out by using material for extrusion molding of the present invention. When molding the material according to the present invention, an extruded product can be produced with excellent appearance and physical properties such as heat resistance and chemical resistance in a continuous and stable condition.

The present invention is described in greater detail with Examples and Reference Examples in the following.

REFERENCE EXAMPLE 1

Preparation of Polystyrene Having a Syndiotactic Configuration

Two liters of toluene as a solvent, and 1 mmol of cyclopentadienyl titanium trichloride and 0.6 mol (as an aluminum atom) of methyl aluminoxane were introduced into a reactor, and 3.6 liters of styrene were introduced thereto and the polymerization reaction was carried out at 20° C. for 1 hour.

After completion of the polymerization, the reaction mixture was washed with a mixture of hydrochloric acid and methanol to decompose and remove the catalyst components, and dried to give 330 g of a styrene-based polymer. The polymer was subjected to Soxhlet extraction using methyl ethyl ketone as a solvent to give 95% by weight of an extraction residue. The weight average molecular weight of the polymer was 290,000, the number average molecular weight whereof was 158,000 and the melting point was 270° C. A nuclear magnetic resonance spectral analysis of the said polymer using a carbon isotope ($^{13}$C-NMR, solvent: 1,2-dichlorobenzene) showed absorption at 145.35 ppm, which was ascribable to the syndiotactic configuration, and the syndiotacticity indicated in terms of racemic pentad as calculated from the peak area was 96%. The melt viscosity of this powder measured at 300° C. and a shearing rate of 10/sec was $5 \times 10^3$ poise.

REFERENCE EXAMPLE 2

Preparation of Polystyrene Having Syndiotactic Configuration

Two liters of toluene as a solvent, and 5 mmol of tetraethoxytitanium and 500 mmol (as an aluminum) of methylaluminoxane as catalyst components were placed in a reactor, and 15 liters of styrene were introduced thereto and polymerized at 50° C. for 4 hours.

After completion of the polymerization, the reaction mixture was washed with a mixture of hydrochloric acid and methanol to decompose and remove the catalyst components, and then dried to obtain 2.5 kg of a styrene-based polymer (polystyrene). The polymer was subjected to Soxhlet extraction using methyl ethyl ketone as a solvent to obtain 95% by weight of an extraction residue. The weight average molecular weight of the polymer was 800,000. A $^{13}$C-NMR analysis (solvent: 1,2- dichlorobenzene) showed absorption at 145.35 ppm, which was ascribable to the syndiotactic configuration, and the syndiotacticity indicated in terms of racemic pentad as calculated from the peak area was 96%. the melt viscosity of this powder measured in the same manner as in Reference Example 1 was $8 \times 10^4$ poise.

EXAMPLE 1

0.7 part by weight of (2,6-di-tert-butyl-4-methylphenyl) pentaerythritol diphosphite (Trade Mark: PEP-36, produced by ADECA ARGUS Co., Ltd.) and 0.1 part by weight of tetrakis-(methylene(3,5-di-tert-butyl-4-hydroxyphenyl)-propionate)-methane (Trade Mark: Irganox 1010, NIPPON CIBA-GEIGY Co., Ltd.) as antioxidants were added to 100 parts by weight of styrene-based polymer obtained in Reference Example 1, and dry blended.

The resulting powder was extruded to form strand using a vented uniaxial extruder at 300° C., and the extruded strand was quenched by air (room temperature of 30° C., flow rate of 0.01 m/sec), and then was pelletized by using a pelletizer.

The resulting pellet was 3 mm in length in the extruded direction and 2.5 mm in width, and had a crystallinity of 35%.

Sheet molding was carried out using the pellet. The extruder used had a screw, with a diameter of 20 mm and L/D of 20, of the full flight type, and was equipped with a T-die having a lip width of 200 mm and a lip opening of 500 μm at a tip thereof. Extrusion was carried out using the extruder at a screw rotation of 100 rpm and at the resin temperature of 310° C. at the end of the die. The extruding rate was 5 kg/hr, and the shearing stress was $3.3 \times 10^5$ dyne/cm$^2$.

In molding the sheet, the pellets did not agglomerate around the inlets of hopper and screw, pellets were fed smoothly in a stable state with no fluctuations of the feed rate and a sheet was obtained continuously with an excellent appearance and uniform width in the extrusion direction.

EXAMPLE 2

Strands were molded by extrusion of pellets obtained in Example 1. The extruder used was the same as in Example 1, to which a die having a capillary diameter of 3.2 mm was attached at a tip thereof, and extrusion was carried out at a screw rotation of 20 rpm and the resin temperature of 310° C. at the end of the die.

The extrusion rate was 1 kg/hr and the shearing stress was $3.3 \times 10^5$ dyne/cm$^2$. The result is shown in the Table.

EXAMPLE 3

With the exception that the strand which had been cooled with water and solidified immediately after melt extrusion was pelletized, the pellet was prepared in the same manner as in Example 1. The water temperature was 20° C. The pellet thus obtained had 3 mm in length in the extrusion direction, 3 mm in width, and had a crystallinity of 10%.

This pellet was crystallized while stirring with hot air at 150° C. for 5 hours to be converted into a pellet with a crystallinity of 51%. The pellet thus obtained was blow molded by using a direct blow molding machine with which an accumulator is attached to prepare a bottle having an inner volume of 500 ml.

The resin temperature at an outlet of the circular die was 290° C. and the shearing stress was $7.3 \times 10^5$ dyne/cm$^2$. The results are shown in the Table.

EXAMPLE 4

In the same manner as in Example 1 except for changing a winding rate to 3 m/min, a film having a thickness of 86 μm was prepared. The result is shown in the Table.

EXAMPLE 5

In the same manner as in Example 3 except for changing the crystallization time to 30 min, the pellet was prepared. The crystallinity of the pellet was 46%. By using the pellet, sheet-molding was carried out as in Example 1. The result is shown in the Table.

EXAMPLE 6

In the same manner as in Example 1 except for using the polystyrene obtained in the above Reference Example 2, the pellet was prepared. The pellet obtained had 3 mm in length in the extrusion direction, 2.8 mm in width, and a crystallinity of 40%.

By using the pellet, sheet-molding was carried out using the same extruder as in Example 1.

The condition of the molding was set at 1000 μm for the lip opening of T-die, 24 rpm for the screw rotation number, 1.2 kg/hr for the extrusion rate, and $6.0 \times 10^5$ dyne/cm$^2$ for the shearing stress. The result is shown in the Table.

COMPARATIVE EXAMPLE 1

Sheet-molding was carried out using pellet before crystallization prepared in Example 3 (crystallinity: 10%) in the same manner as in Example 1. When pellet was fed into the hopper, it adhered to parts of the screw, was partially agglomerated and feeding was irregular. An sheet thus obtained had unevenness in thickness in the extrusion direction with variations of 30% or more.

COMPARATIVE EXAMPLE 2

In the same manner as in Example 3 except that crystallization treatment of the pellet was not carried out, direct blow molding was carried out.

The same phenomena as in Comparative Example 1 occurred at the bottom of the hopper. A period of feeding to the accumulator was required 5 times as much as in Example 3. The resulting molded product obtained contained many foams and had an unevenness in thickness with variations of 15% or more, was colored (yellowish), and had a poor appearance. The resin temperature at the die exit and the shearing rate were the same as in Example 3.

COMPARATIVE EXAMPLE 3

In the same manner as in Example 6 except that the condition was set with a T-die lip opening of 200 μm, a screw rotation of 100 rpm and resin temperature at the die exit of 290° C., sheet-molding was carried out. The extrusion rate was 5 kg/hr and the shearing stress was $6.0 \times 10^6$ dyne/cm$^2$.

The surface of the sheet obtained had a rough surface due to generation of melt fracture, a poor appearance and no luster.

What is claimed is:

1. A pellet for extrusion molding having a ratio of length in extrusion direction to length in perpendicular direction of 0.5 to 3 and a length or width of extrusion direction or perpendicular direction of 1 to 6 mm comprising at least one member selected from the group consisting of polystyrene, poly(alkylstyrene), and copolymer of styrene and alkylstyrene having a high degree of syndiotactic configuration, a melt viscosity of $10^3$ to less than $10^6$ poise measured at 300° C. and a shearing rate of 10/sec, and a crystallinity of 15% to 60%.

2. The pellet according to claim 1, wherein the crystallinity is 20% to 60%.

3. The pellet for extrusion molding according to claim 1, wherein the crystallinity is 30% to 60%.

4. A pellet for extrusion molding having a ratio of length in extrusion direction to length in perpendicular direction of 0.5 to 3 and a length or width of extrusion direction or perpendicular direction of 1 to 6 mm consisting essentially of at least one member selected from the group consisting of polystyrene, poly(alkylstyrene), and copolymer of styrene and alkylstyrene having a high degree of syndiotactic configuration, a melt viscosity of $10^3$ to less than $10^6$ poise measured at 300° C. and a shearing rate of 10/sec, and a crystallinity of 15% to 60% and at least one member selected from the group consisting of a thermoplastic resin, a rubber, an inorganic filler, an antioxidant, a nucleating agent, a plasticizer, a solubilizing agent, a colorant, and an antistatic agent.

5. A process for preparing a pellet having a ratio of length in extrusion direction to length in perpendicular direction of 0.5 to 3 and a length or width of extrusion direction or perpendicular direction of 1 to 6 mm and a crystallinity of 15% to 60% comprising melt extruding at least one member selected from the group consisting of polystyrene, poly(alkylstyrene), and copolymer of styrene and alkylstyrene having a high degree of syndiotactic configuration and a melt viscosity of $10^3$ to less than $10^6$ poise measured at 300° C. and a shearing rate of 10/sec, and then air cooling and cutting the extruded polymer.

TABLE

| No. | Powder Weight average molecular weight | Pelletize Cooling | Pelletize After Cooling | Pellet Crystallinity (%) | Shearing stress at molding (dyne/cm$^2$) | Molded Product Shape | Surface foaming | Uneven surface | Continuous molding |
|---|---|---|---|---|---|---|---|---|---|
| Example 1 | 290,000 | Air cooling | Air drying | 35 | $3.3 \times 10^5$ | Sheet | No | No | Excellent |
| Example 2 | 290,000 | Air cooling | Air drying | 35 | $3.0 \times 10^5$ | Strand | No | No | Excellent |
| Example 3 | 290,000 | Water cooling | 150° C., 5 hrs | 51 | $7.3 \times 10^5$ | Bottle | No | No | Excellent |
| Example 4 | 290,000 | Air cooling | Air drying | 35 | $3.3 \times 10^5$ | Film | No | No | Excellent |
| Example 5 | 290,000 | Water cooling | 150° C., 30 mins | 46 | $3.3 \times 10^5$ | Sheet | No | No | Excellent |
| Example 6 | 800,000 | Air cooling | Air drying | 40 | $6.0 \times 10^5$ | Sheet | No | No | Excellent |
| Comparative Example 1 | 290,000 | Water cooling | Air drying | 10 | $3.3 \times 10^5$ | Sheet | No | No | Uneven sheet width with variation |
| Comparative Example 2 | 290,000 | Water cooling | Air drying | 10 | $7.3 \times 10^5$ | Bottle | Yes | Yes | Uneven sheet width with variation |
| Comparative Example 3 | 800,000 | Air cooling | Air drying | 40 | $6.0 \times 10^6$ | Sheet | No | Yes | Excellent |

6. The process according to claim 5, wherein the at least one member selected from the group consisting of polystyrene, poly(alkylstyrene), and copolymer of styrene and alkylstyrene is melt-extruded at a temperature in the range between the melting point of the polymer and a temperature 100° C. higher than the melting point.

7. A process for preparing a pellet having a ratio of length in extrusion direction to length in perpendicular direction of 0.5 to 3 and a length or width of extrusion direction or perpendicular direction of 1 to 6 mm comprising melt extruding a composition consisting essentially of at least one member selected from the group consisting of polystyrene, poly(alkylstyrene), and copolymer of styrene and alkylstyrene having a high degree of syndiotactic configuration, a melt viscosity of $10^3$ to less than $10^6$ poise measured at 300° C. and a shearing rate of 10/sec, and a crystallinity of 15% to 60% and at least one member selected from the group consisting of a thermoplastic resin, a rubber, an inorganic filler, an antioxidant, a nucleating agent, a plasticizer, a solubilizing agent, a colorant, and an antistatic agent, and then air cooling and cutting the extruded composition.

8. The process according to claim 7, wherein the composition is melt-extruded at a temperature in the range between the melting point of the at least one member selected from the group consisting of polystyrene, poly(alkylstyrene), and copolymer of styrene and alkylstyrene and a temperature 100° C. higher than the melting point.

9. A process for preparing a pellet having a ratio of length in extrusion direction to length in perpendicular direction of 0.5 to 3 and a length or width of extrusion direction or perpendicular direction of 1 to 6 mm and a crystallinity of 15% to 60% comprising melt extruding at least one member selected from the group consisting of polystyrene, poly(alkylstyrene), and copolymer of styrene and alkylstyrene having a high degree of syndiotactic configuration and a melt viscosity of $10^3$ to less than $10^6$ poise measured at 300° C. and a shearing rate of 10/sec, water cooling and cutting the extruded polymer, and then heating the cut polymer.

10. The process according to claim 9, wherein the at least one member selected from the group consisting of polystyrene, poly(alkylstyrene), and copolymer of styrene and alkylstyrene is melt-extruded at a temperature in the range between the melting point of the polymer and a temperature 100° C. higher than the melting point.

11. The process according to claim 9, wherein the extruded and cut polymer is heated at a temperature in the range between the glass transition temperature of the polymer and a temperature 10° C. lower than the melting point of the polymer.

12. A process for preparing a pellet having a ratio of length in extrusion direction to length in perpendicular direction of 0.5 to 3 and a length or width of extrusion direction or perpendicular direction of 1 to 6 mm comprising melt extruding a composition consisting essentially of at least one member selected from the group consisting of polystyrene, poly(alkylstyrene), and copolymer of styrene and alkylstyrene having a high degree of syndiotactic configuration, a melt viscosity of $10^3$ to less than $10^6$ poise measured at 300° C. and a shearing rate of 10/sec, and a crystallinity of 15% to 60% and at least one member selected from the group consisting of a thermoplastic resin, a rubber, an inorganic filler, an antioxidant, a nucleating agent, a plasticizer, a solubilizing agent, a colorant, and an antistatic agent, water cooling and cutting the extruded composition, and then heating the cut composition.

13. The process according to claim 12, wherein the composition is melt-extruded at a temperature in the range between the melting point of the at least one member selected from the group consisting of polystyrene, poly(alkylstyrene), and copolymer of styrene and alkylstyrene and a temperature 100° C. higher than the melting point.

14. The process according to claim 12, wherein the extruded and cut composition is heated at a temperature in the range between the glass transition temperature of the polymer and a temperature 10° C. lower than the melting point of the polymer.

* * * * *